United States Patent
Lehe et al.

[11] 3,804,067
[45] Apr. 16, 1974

[54] SLATTED FLOORING CONNECTOR SYSTEM

[75] Inventors: Russell B. Lehe, Cleveland; Richard L. Torbeti, Akron, both of Ohio

[73] Assignee: Norandex, Inc., Cleveland, Ohio

[22] Filed: June 9, 1972

[21] Appl. No.: 261,395

[52] U.S. Cl. .................................. 119/28
[51] Int. Cl. ............................... A01k 01/00
[58] Field of Search ...................... 119/28, 16

[56] References Cited
UNITED STATES PATENTS

| | | |
|---|---|---|
| 3,730,140 | 5/1973 | Bowser et al. ............... 119/28 |
| 3,721,215 | 3/1973 | Vickstrom ................... 119/28 |
| 3,230,931 | 1/1966 | Taylor et al. ................ 119/28 |
| 3,528,391 | 9/1970 | Johnson ...................... 119/28 |

*Primary Examiner*—Hugh R. Chamblee
*Attorney, Agent, or Firm*—Meyer, Tilberry & Body

[57] ABSTRACT

A lightweight, easily-assembled slatted flooring system for an animal enclosure comprising a plurality of channels interlocked in spaced parallel relationship by connectors having a base, and first and second upwardly extending portions which engage the bottom and sidewalls of the channels to lock the channels in place.

8 Claims, 2 Drawing Figures

PATENTED APR 16 1974 3,804,067

SLATTED FLOORING CONNECTOR SYSTEM

This invention pertains to a slatted flooring system and more particularly to the devices connecting the slats together.

The invention is particularly applicable to slatted flooring used in raising farm animals in a confined area and will be described with particular reference thereto, although it will be appreciated that the invention can be used for any slatted floor arrangement wherein a permanent, easily assembled, smooth, slatted flooring is desired.

It has long been recognized that the key to profitable production of farm animals raised in confinement is sanitation. Clean environments have heretofore been provided by erecting an enclosure having slatted flooring over a central portion thereof and a pit usually filled with water underneath the flooring through which waste matter can be washed away.

Such flooring has typically been constructed of wood which has proven undesirable for a number of reasons. Wood becomes slippery when wet or when impregnated with waste. It is expensive to construct, difficult to maintain and lasts a relatively short time. Some animals, particularly swine, have been known to chew through wooden slats. Other types of flooring have been similarly afflicted with inherent disadvantages. Steel floors encounter severe corrosion problems. Concrete slats are expensive to manufacture, costly to transport and often chip, sometimes cracking, thereby resulting in slat failure.

These problems have been recognized and at least partially overcome by some installations which provided a flooring comprising extruded aluminum channels arranged in spaced-parallel relationship. However the means heretofore used to interconnect the channels in spaced parallel relationship have inherent defects which adversely affects their use as a flooring for farm animals.

For example, one type of installation used a plurality of connectors which extended over the top of the channel and interconnected the channels together by fastening onto adjacent channel sidewalls. While this connector firmly interlocked the channels, the presence of the connectors on top of the channels proved to be obstructions to the animals when crossing the floor sometimes resulting in falls causing leg injuries.

Another arrangement used a connecting bar extending the width of the flooring to connect and space the channels by fastening the channel flanges on the underside of the channel into tongs protruding from the connector bar. The flooring was assembled by the use of a tool which spread out the channel sidewalls thereby allowing the channel flanges to fit over the tongs extending from the connector bar; the flanges snapping into place when the sidewall pressure was released. The inherent resiliency of the channel was thereby utilized to maintain the channels in assembled relationship. This arrangement proved unsuitable for use as a livestock flooring because the weight of the animal would cause the channel flanges to pop out of the tongs if the animal stepped on the channel's corner. In many instances a piglet would unseat the channel from the connector and break its leg as it fell between the now enlarged spacing between the channels.

The present invention contemplates a safe connector system suitable for use as a livestock flooring which provides rigid, unyielding connections between the channels.

In accordance with the present invention there is provided a plurality of pairs of connectors for holding a plurality of elongated, inverted U-shaped channels in spaced parallel relationship wherein each channel is comprised of a base defining a load carrying surface, first and second sidewalls extending downwardly from the edges of the base and support flanges extending horizontally from the bottom edges of the sidewalls.

Each connector comprises a base portion having a plurality of pairs of upwardly extending projections at spaced intervals along its length, each projection having an edge adapted to abut and support a channel sidewall. One projection in one pair has a groove at the juncture of its leading edge and the base which is adapted to receive one of the channel support flanges.

When assembled the base portion of each connector contacts the bottom of the flanges; the first projection abuts the sidewall's inner surface; the second projection abuts the channel's opposing sidewall at its outer surface and the groove receives the flange. The second connector which is the mirror image of the first connector likewise has its first projection engaging the inner surface of the other sidewall; its second projection engaging the outer surface of the opposing sidewall and the groove receiving the flange. The connectors in mirrored pairs are firmly secured to each other by fasteners extending through their bases.

Each channel is rigidly secured to the connectors by its flanges interlocking in the grooves and is firmly braced against lateral movement by the connector projections abutting the inner and outer sidewall surfaces. The spacing between the first and second projections on the connectors determines the spacing between the channels.

To assemble, the channels are placed over the pit; one connector is moved into place by (a) positioning its first projection in the space between the channel flanges, (b) raising the connector upward until its base portion contacts the underside surface of the flanges, and (c) laterally moving the connector until its projections contact the channels sidewalls at their respective surfaces. The second connector is similarly positioned and the two connectors are fastened together.

The principle object of the invention is to provide a lightweight slatted flooring system which is easily assembled.

Another object of the invention is to provide a connection for a slatted flooring system which braces the slats against movement.

A further object of the invention is to provide a slatted flooring system with slats rigidly interconnected.

A further object of the invention is to provide a safe, slatted flooring system for raising animals in confinement.

A further object of the invention is to provide an improved slatted flooring system and method of constructing the same which is both simple and economical.

The invention may take physical form in certain parts and arrangements of parts a preferred embodiment of which will be described in detail herein and illustrated in the accompanying drawings which form a part hereof and wherein.

Figure 1:
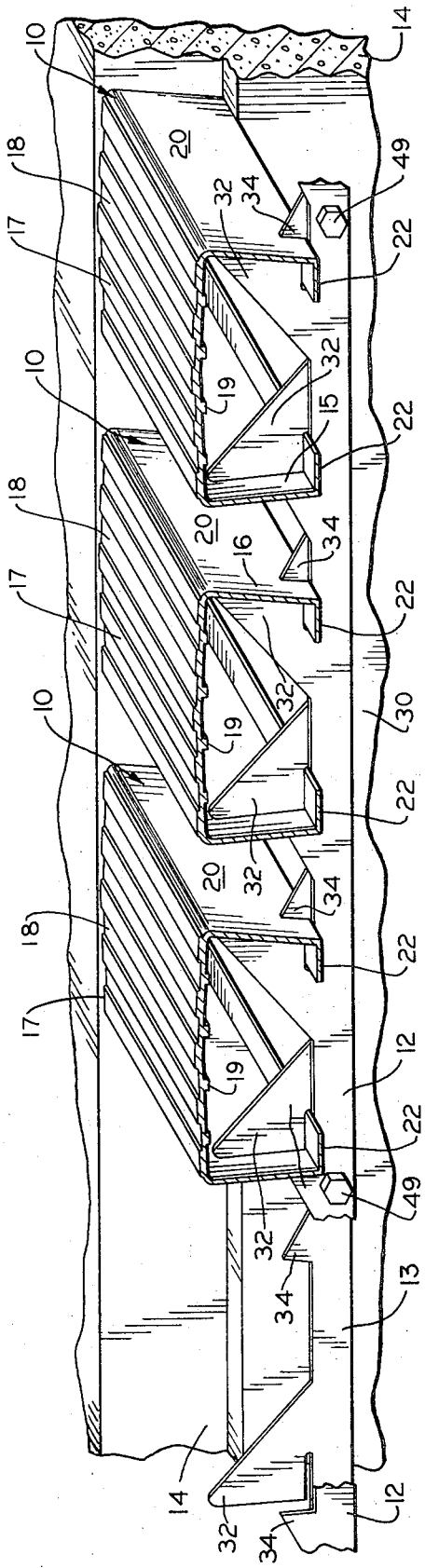
FIG. 1 is a perspective view of the assembled flooring.

Referring now to the drawings wherein the showings are for the purpose of illustrating a preferred embodiment of the invention only and not for the purpose of limiting same, FIG. 1 illustrates the general arrangement of the slatted flooring construction. The flooring comprises a plurality of longitudinally extending, inverted U-shaped channels 10 with connectors 12, 13 interlocking the channels 10 in spaced-parallel relationship. The flooring is supported by the end walls 14 of a pit which the flooring covers.

Not shown because unnecessary to the description of the invention is the farm animal enclosure. Such enclosure generally comprises a frame structure having a concrete floor adjacent the slatted flooring. Usually the slatted flooring is in the center of the enclosure with the concrete floor or slabs on both sides of the slatted flooring inclined vertically-upwardly therefrom. Another typical enclosure utilizes a concrete center section, generally V-shaped, with two slatted floors extending vertically-downwardly from both ends of the center section. Either arrangement permits easy maintenance because the refuse can be washed from the concrete pad or pads through the slatted flooring to the pit below.

Of course, the slatted flooring can comprise the complete floor of the enclosure. Such construction requires relatively long channel members and channel supports in the form of joists or a center wall to prevent the channel member from deflecting vertically downward under the weight of the animals.

Figure 2:
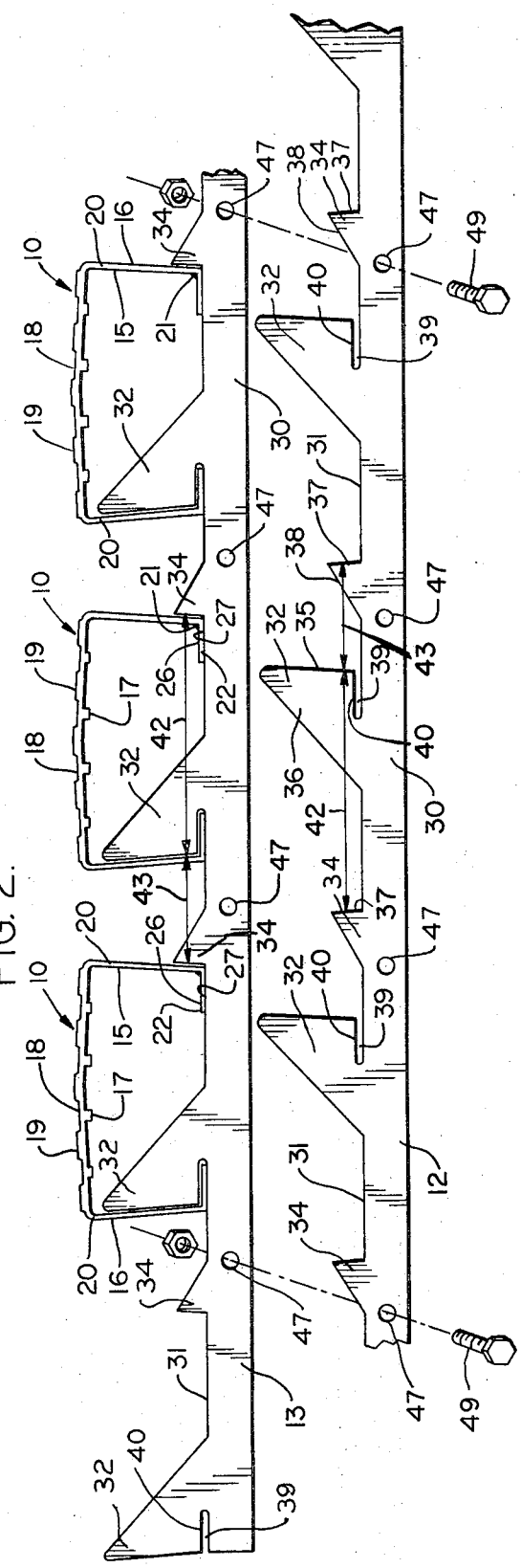
FIG. 2 is a front elevation view of the channels, and connectors.

As is thus shown in the cross-sectional view of the channel in FIG. 2, each channel 10 is in the shape of an inverted U having a base 18, defining a load carrying surface and a pair of sidewalls 20. The base can be flat although in the preferred embodiment it is slightly crowned with a plurality of longitudinally-extending ribs 17, 19 on the lower and upper surfaces respectively. Ribbing and crowning the base 18 increases its rigidity thereby allowing the channel to be constructed of a thinner cross-sectional area than would otherwise be required.

Each channel sidewall 20, has an inside and outside surface 15, 16 and tapers inwardly at an angle of about 5° to facilitate the flowing of waste matter between the channels to the pit below. Other angles may be employed.

Extending inwardly from the bottom of each sidewall 20 is a support flange 22 having a flat bottom surface 27 and an upper surface 26. The flanges should be long enough and the surfaces 27 are in a common plane such as to provide a stable support for each channel thereby preventing any tendency of the channel to rock or roll under load. Although upper surfaces 26 could be flat they are shown as filleted 21 to the sidewall thereby strengthening the sidewall and flange joint.

The connectors 12, 13 as shown, comprise a base portion 30, having an upper edge 31, a first projection 32 extending from the upper edge 31 of the base; and a second projection 34 extending also from the upper edge 31 of the base portion 30. The first projection has a leading edge 35 and a trailing edge 36. Similarly the second projection 34 also has a leading edge 37 and a trailing edge 38. The leading edges 35, 37 of both projections 32, 34 have slopes equal to the slope of the channel sidewalls, i.e., 5°. The upper projections 32 and 34 are shown as triangular in shape although it is not necessary to the operation of the invention for these projections to assume such shape. The slope of the trailing edges 36, 38 of projections 32, 34, can be varied.

At the juncture of the leading edge 35 of the first projection 32 with the base 30 is a longitudinally extending groove 39. Groove 39 has a length at least equal to and preferably slightly greater than the length of the support flange. The upper wall 40 of groove 39 has a slight taper corresponding to the fillet 21 shown between the channel sidewall 20 and support flange 22.

As shown the spacing between the upper projections of the connector occur at two alternately repeating intervals 42, 43. The first spaced interval 42 is the distance from the leading edge 37 of a second projection 34 to the leading edge 35 of the first projection 32 adjacent the leading edge 37 of the projection 34 from which the interval is measured. Spaced interval 42 approximately equals the width of the channel 10. The second spaced interval 43 is the distance from the leading edge 35 of a first projection 32 to the leading edge 37 of the projection 34 adjacent the leading edge 35 of the projection 32 from which the interval is measured. Spaced interval 43 approximately equals the spacing between adjacent channels.

In the base portion 36 of each connector are a plurality of securing holes 47 adapted to receive any type of fastener 49 to secure connector strips 12, 13 together. Because each connector is the mirror image of the other the securing holes 47 are shown at spaced intervals along each connector's length thereby assuring alignment of the holes. It should be clear though that the connectors can be furnished without securing holes 47; the holes being drilled in the field. Other clamping means may be provided to lock the connectors against longitudinal movement.

When assembled, the leading edges 35, of the first projections 32 of one connector 12 fit within each channel's profile abutting against an inside side wall surface 15 and the leading edges 37 of the second projections 34 of the connector 12 abut against each channel's opposing sidewall's outside surface 16. Similarly the leading edges 35, 37 of the projections 32, 24 of the second connector 13 abut against the remaining sidewall surfaces 15, 16 respectively. A slight clearance exists between each support flange 22 and groove 39 and this clearance plus the taper in the groove's upper wall 40 assures easy assembly of the connectors to each channel.

Hence, it is readily apparent, that an unyielding interlocking of the channels is accomplished. Because the channel sidewalls are firmly sandwiched between the connector projections 32, 34 the channels 10 are prevented from shifting laterally. The grooves 37 in the connector receiving the support flanges 22, besides adding stability to the connection further assures that the channels will remain interlocked no matter how great a force is transmitted to the channel's upper corners. The base portion 30 of the connector being in contact with bottom surface of the support flange 27 increases the section moduli of the channel thereby strengthening the channel.

The flooring could be assembled in a wide variety of ways although the preferred manner of assembly would be to secure one of the connectors 12, 13 whether temporarily or permanently to the end wall of the pit or to a center joist. The connector could be so secured by the use of two or more securing holes 47 and the connector is positioned so that the upper edge 31 of the base portion is in line with the supporting surface of the joist or end wall. The channels are then dropped into position and moved laterally until the leading edges of the projections 32, 34 contact their respective sidewall surfaces 15, 16 and the support flanges 22 are firmly received in the connector grooves 39. The channels are now in spaced parallel relationship and ready for easy assembly of as many pairs of connectors as desired. Each connector is assembled into position by raising the connector with the first projection 32 in the space between the ends of the support flanges 22 until the upper edge 31 of the connector base portion 30 contacts the bottom surface 27 of the support flanges and then moving the connector laterally until the support flanges 22 fit into the grooves 39 and the leading edges 35, 37 contact their respective sidewall surfaces. Each pair of connectors is then secured together by fasteners 49 through the securing holes 47.

It is apparent that many modifications may be incorporated into the connector system without departing from the spirit or essence of the invention. For example, the connectors could be secured together in a spaced relationship by means of spacers inserted therebetween through which pass the fasteners. As so spaced, added rigidity would be given to the flooring.

The height of the projections 32, 34 can be varied. The slope of the trailing edge 35, 37 changed or even moved to make the upper portions wider or narrower so long as enough space is provided for assembly.

The securing holes 47 could be elongated and a spud wrench inserted therein during assembly to assure a rigid connection between the two. In conjunction with the modified securing holes a slight deformable projection extending either from the groove 39 or the support flanges 22 could be used. This deformable projection would crush out during assembly thereby assuring a rigid connection between the connector and channel.

It is the essence of the invention therefore to provide a connector system which utilizes connectors secured to the extending projections which connectors rigidly interconnect the channels by contacting the sidewalls of said channels with projections of paired connectors, the projections of the individual connectors of the paired connectors being of a size to pass through the space between the support flanges of a channel, and to be laterally shifted to engage the channel sidewalls. Second projections of a size to fit into the space between adjacent channel and to be laterally shifted to engage the outside surfaces of the channel sidewalls may also be provided. After insertion and lateral shifting, the two connectors of a connector pair are interconnected.

Having thus described our invention we claim:

1. A slatted flooring construction comprising a plurality of elongated channels, each channel comprising a base defining a load carrying surface, first and second sidewalls extending downwardly from the edges of the base, a support flange extending inwardly from the bottom edge of each sidewall, and connectors to interlock said channels in spaced parallel relationship, the improvement which comprises
    a. at least one pair of first and second connectors;
    b. each connector having a base portion and a series of spaced first and second projections extending upwardly therefrom;
    c. said first projections being of a size to pass through the respective spaces between the support flanges of individual channels whereby each connector may be raised to position said first projections within the channels' profile and then laterally moved relative to said channels to engage said first projections with said channels prior to fastening said first and second connectors together; and
    d. said second projections being of a size to pass through the respective spaces between adjacent ones of said channels whereby upon raising each connector to position said first projections, said second projections are positioned into said respective spaces between adjacent channels, and upon laterally moving said connector relative to said channels said second projections engage said channels.

2. The improvement as set forth in claim 1 wherein said first projections have leading edges and further including a groove at the juncture of the leading edge of said first projection and said base portion, said groove being adapted to receive said support flange therein.

3. The improvement as set forth in claim 2 further including fastener means adapted to secure together said first and second connectors of each pair of connectors.

4. The improvement as set forth in claim 2 wherein said base portion of the connector has an upper edge and lower edge, said upper edge contacting the lower surface of said support flange.

5. The improvement as set forth in claim 2 wherein said groove is at least as long as said support flange.

6. The improvement as set forth in claim 1 wherein said first and second projections are spaced, respectively, at first and second alternately repeating intervals along the length of the base portion of said connector, said first interval being approximately equal to the width of said channels, and said second interval being approximately equal to the spacing between adjacent channels.

7. The improvement as set forth in claim 1 wherein each connector of a pair is the mirror image of the other.

8. A slatted flooring construction comprising a plurality of elongated channels, each channel comprising a base defining a load carrying surface, first and second sidewalls extending downwardly from the edges of the base, a support flange extending inwardly from the bottom edge of each sidewall, and connectors to interlock said channels in spaced parallel relationship, the improvement which comprises
    a. at least one pair of first and second connectors fastened one to the other;
    b. each connector having a base portion and a series of spaced first and second projections extending upwardly therefrom;
    c. said first projections being of a size to pass through the respective spaces between the support flanges of individual channels and into the channels' profile, said first projections abutting the interior surfaces of a sidewall;

d. the first projections of said first connector engaging respective interior surfaces of said first sidewalls and the first projections of said second connector engaging respective interior surfaces of said second sidewalls;

e. said second projections being of a size to pass through the respective spaces between adjacent ones of said channels, and said second projections engaging the exterior surfaces of said sidewalls;

f. the second projections of said first connectors engaging respective exterior surfaces of said second sidewalls, and the second projections of said second connectors engaging respective exterior surfaces of said first sidewalls; and g. said first and second connectors of a pair of connectors being fastened together.

* * * * *

UNITED STATES PATENT OFFICE
CERTIFICATE OF CORRECTION

Patent No. 3,804,067     Dated April 16, 1974

Inventor(s) Russell B. Lehe, Richard L. Torbett

It is certified that error appears in the above-identified patent and that said Letters Patent are hereby corrected as shown below:

On the first page of the patent, left hand column, line 4, delete "Torbeti" and substitute ---Torbett---.

Signed and sealed this 17th day of September 1974.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

Patent No. 3,804,067  Dated April 16, 1974

Inventor(s) Russell B. Lehe, Richard L. Torbett

It is certified that error appears in the above-identified patent and that said Letters Patent are hereby corrected as shown below:

On the first page of the patent, left hand column, line 4, delete "Torbeti" and substitute ---Torbett---.

Signed and sealed this 12th day of November 1974.

(SEAL)
Attest:

McCOY M. GIBSON JR.
Attesting Officer

C. MARSHALL DANN
Commissioner of Patents